Jan. 20, 1942.   H. SCHNEIDER   2,270,691
GRINDING TOOL
Filed Dec. 12, 1938   2 Sheets-Sheet 1

Inventor,
H. Schneider
By: Glascock Downing & Seebold
Attys.

H. Schneider
Inventor

& nbsp;
UNITED STATES PATENT OFFICE 2,270,691

GRINDING TOOL

Hermann Schneider, Berlin-Neukolln, Germany, assignor of one-half to Julius Pintsch Kommandit-Gesellschaft, Berlin, Germany Application December 12, 1938, Serial No. 245,302
In Germany January 12, 1938

7 Claims. (Cl. 51—209)

This invention relates to a grinding tool which consists of a metallic carrier with grinding material firmly superposed directly thereon. This grinding tool renders it possible to produce surfaces, and therefore also cutting edges, of a quality hitherto unattainable on workpieces in current preparation, with an economy that has not hitherto been regarded as possible. The invention solves the problem of ensuring that the grinding operation, at all the active parts of the tool, is a removal of shavings. The invention also comprises methods of manufacturing such a tool.

Fundamentally in grinding tools which consist of a carrier with grinding material firmly superposed thereon, and also in all other grinding tools hitherto usual, for instance in emery wheels, or in artificial resin discs with diamond dust embedded therein, the occurrence of a removal of shavings, that is, of a cutting, is aimed at. In all the grinding tools of this nature hitherto used, however, this is only incompletely attained, in so far as the cutting operation occurs only in comparatively few and narrowly limited regions of the entire working surface of the tool. This working condition of the grinding tool is moreover maintained during only a short period of use. The grinding shavings cut off fill up the interstices between the working points, which will hereinafter be referred to as tips, of the grains of grinding material, and exert a hammering effect upon the workpiece, since they cannot escape in an uninterrupted working operation. The initial cutting by the operative tips of the grinding material also gradually merges, as the tips of the grinding material wear away, into a beating and thrusting on the workpiece surface to be treated. This occurs comparatively quickly, because with the grinding tools of the kind in question hitherto in use, the few grinding material tips that have a shaving-removing effect are exceedingly highly stressed. This beating and thrusting has the result that grinding material tips that have not yet participated in the cutting operation can always only become operative in a very incomplete manner, and are then still hindered by blunt grains. On these grounds the quality of the surface produced on the workpiece does not admit of being improved beyond a definite limit by increasing the expenditure of work in the treatment by prolonging the duration of the work.

These disadvantages make themselves felt more persistently the finer the grain of the grinding material. In order to moderate them grinding tools are used upon which the grinding material is rolled out by rolling movements. This process, first used to a very wide extent in the technology of glass-working, and there developed to its highest completeness, has also been adopted in the treatment of metal. Here an operation takes place which is indeed substantially composed of a beating and thrusting, but in addition also comprises a rolling-grinding, that is, it proceeds otherwise than in glass-grinding, where a sliding or pushing occurs, which is more marked the finer the grinding material is, and is therefore most marked in the so-called polishing operation. In the case of glass a complete polishing is obtained in this way, because glass is a solid solution without a crystalline character. In the case of metals and metallic alloys the crystalline structure hinders the production of polished surfaces of the quality of polished glass surfaces. On the same ground no complete cutting edge can be produced on workpieces of metal or of a metallic alloy; the cutting edges obtainable by this process have a relief corresponding to the crystalline structure.

The surfaces and cutting edges of the highest quality hitherto produced on workpieces of metals or of metallic alloys require an extravagant expenditure of work, because the limits laid down by the imperfection of the treatment tools and of the kinds of work have to be overcome by the skill of very high-grade craftsmanship. This invention is based on the discovery that complete surfaces and cutting edges can be provided on workpieces of metals and metallic alloys in an economical manner only by means of grinding tools which cut surfaces on the workpiece as it were automatically, namely, as independently as possible of the skill of the operator.

According to the invention this result is obtained by the following measures or properties, for the carrying out of which special processes have been developed:

In the first place the tips of all the grains of grinding material are freely exposed above the metallic carrier, exactly in the surface that is to be ground by the tool. This ensures that the surface to be ground stresses all the grains of grinding material covered by it uniformly, and receives equally deep incisions from them throughout its entire extent. The efficiency of the grinding tool according to the invention is consequently very high. This is particularly well recognized by visualising the path traversed from coarse grinding to the finest grinding, wherein graded grinding tools with progressively finer grains of grinding material are employed. The bottoms of the valleys of the profile of the cross section of the work-piece machined by the preceding tool already lie all exactly in the desired surface, and the second and each subsequent grinding tool cut away a portion of the hills of the same profile in perfect uniformity according to the size of grain of its grinding material.

Secondly the surface of the metallic carrier of the grains of grinding material is according to the invention equidistant from the imaginary surface through all the tips of the grinding material. The part to be removed from the workpiece each time is thereby reduced to a minimum, and at the same time the grinding tool thus provided admits of being very completely utilised, for the depth of the removal of shavings is everywhere uniform in the region to which grinding material of the same size of grain is secured, so that the further use of the tool without previously cleaning out the shavings deposited is not hindered by a more or less narrowly limited area of the coating of grinding material such as may lie above a hump in the carrier, although the greater part of the entire coated surface could still take up cut shavings.

Thirdly the surface of the metallic carrier of the grains of grinding material has according to the invention at least the grade of quality required of the finish-ground workpiece surface. Expressed in strictly mathematical terms, the quality of two surfaces is equal if there is a conform relation between the two surfaces in the macrogeometric and in the microgeometric. This is the terminology which has been adopted generally in literature, for instance in the standard work of G. Schmaltz, "Technische Oberflachenkunde," Berlin 1936. This property, which is effected independently of the size of grain of the grinding material, assists the two aforementioned properties, primarily the second one mentioned, and carries the usefulness of the invention to the highest stage.

The importance of the first-mentioned property has already been recognized in the past, and it has already been proposed to attain this property in grinding tools in which the grinding material is held by a binding medium or by an adhesive upon a support usually consisting of paper or of a textile fabric, by subsequently passing a grinding tool of this nature, made in the usual way, between pressing rollers, which are adjustably supported parallel to one another, and of which the upper one, facing the grinding material, had to effect, by the application pressure or by its weight, the demolition of the grains of grinding material standing beyond a definite distance. Now this disintegrating operation does not proceed in such a manner that all the grains of grinding material crushed by the rolls subsequently stand out exactly as far as the grains of grinding material not crushed by the rolls. The disintegrating operation advances moreover by forcing outstanding grains of grinding material either into the layer of binding medium or adhesive or into the support, which usually consists, as already mentioned, of paper or of a textile fabric, and this pressing in is followed to a certain extent, but irregularly, after the cessation of the rolling pressure, by a recovery, so that the desired action only occurs incompletely. For the purposes for which the present invention has been provided, which comprises a metallic carrier and contains no binding medium and no adhesive between the carrier and the grinding material, namely for the purpose of grinding, on metallic workpieces, surfaces and cutting edges in practically absolute completeness by the removal of shavings, grinding tools that are trued by means of press rolls acting in part by crushing operations cannot be employed. This will be particularly clear if one considers the procedure of very fine grinding and visualises that the imperfection of the supporting of revolving press rolls limits the highest quality theoretically attainable, though in practice, owing to the other circumstances set forth, this quality is not even approximately attainable actually, although it still lies considerably below the quality that is indispensable for the finest grinding.

The grinding tool according to the invention has a filling factor which is quite uniformly distributed over the region armoured with grinding tips, and which, referred to the tool, depends firstly upon the size of grain of the grinding material, and secondly upon the closeness or density of the grains secured thereto. With sufficiently coarse grains of grinding material a grinding tool according to the invention admits of being used the longer, before a mechanical removal of the shavings cut becomes necessary, the less the closeness of the coating of particles. With sufficiently fine grains of grinding material, however, this duration is independent of the closeness of the grains secured to the carrier, for here only the portions of space bordering upon the free grinding material surfaces come into consideration for the depositing of the shavings. With coarse grinding tools according to the invention a moderate closeness of the equipment of tips, which is selected with regard to the duration of use, brings with it the advantage of economy of grinding material.

In the case of fine grinding tools according to the invention, for the economy of the working process as a whole, the action of the force of adhesion between workpiece and tool is to be taken into consideration. Now here the diminishing of the closeness of the tips provides a less effective remedy the finer the grain of the grinding material is. Therefore according to the invention, with sufficiently fine-grained grinding material, the arrangement is such that the carrier is armoured with grinding material in a plurality of regions, which are of similar shape and are separated by gaps in the carrier, and a plurality of which are covered by the workpiece surface to be ground by the tool. For the armoured surface portions of the carrier the utmost closeness of the tips is then selected.

This measure at the same time lengthens the aforementioned duration of use, when grinding with a wetted carrier surface, because then the gaps in the carrier occasion an automatic removal of the shavings by capillary forces. This action can be influenced by the cross-sectional formation of the gaps, which in their entirety take the form of a grid. Grid grooves with flanks slightly inclined to one another in a downward direction, for example, are advantageous.

The gaps need not be straight. It has for example been found advantageous for the grinding of narrow workpiece surfaces to provide the carrier with equidistant sinusoidal grooves, so that the separate armoured regions are in the form of sine curves. A transverse grid formation consisting of equidistant straight grooves then leads to a carrier with armoured areas of the same shape in groups. Straight longitudinal and transverse grooves equidistant from one another yield a carrier with armoured areas which are of the same shape throughout, and which may for example be square.

The carrier may consist of a single piece or may be composed of a plurality of parts. If it is rigid the parts may be separable from one another. It is however also possible according to the invention to construct the carrier as a pliable foil which is in either one or more pieces. In the latter case the pieces—there will rarely be more than two—adhere inseparably to one another.

The carrier or carrier portion must be of such a nature, in the region of the surface to which the grains are to be secured, that the fineness of its texture assures the attaining and maintenance of the desired grade of quality of this surface, and that with normal use of the tool the grains of grinding material do not penetrate more deeply into the carrier.

The invention also renders it possible to make a grinding tool with the properties explained, which presents a plurality of superposed carriers in the form of leaves, each with grinding material secured to it, so that the individual grinding surfaces can selectively be taken into use one after the other. The particular leaf-shaped carrier that is uppermost is withdrawable from the remaining portion of the tool. In this manner the next grinding surface is set free. The last grinding surface in this sequence, which is the first in the manufacture of the tool, is formed on a rigid carrier.

A series of embodiments of the invention, and details of the methods of manufacturing them, are illustrated by way of example in the accompanying drawings, in which Figure 1 shows diagrammatically a section through a workpiece which has been taken from a plane grinding wheel of conventional production;

Figure 1:
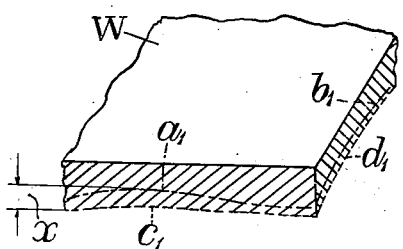

A workpiece taken off a grinding wheel in the course of the grinding operation shows on the ground side an exact image of the covered surface of the grinding wheel at the moment of removal. What is decisive is the imaginary surface passing through all the working points, tips in the normal case, of the granular grinding material of the disc. In ordinary grinding wheels the tips of the grinding material do not all lie exactly in the surface that it is desired to generate on the workpiece by the action of the grinding wheel thereon. At the moment of removal of the workpiece the latter exhibits an irregular doubly curved imaginary surface through all the bottoms of the valleys of the grinding cracks produced by the working points or tips of the grinding wheel. Two traces $a_1$ and $b_1$ of such an imaginary surface are drawn in dot-and-dash lines in Figure 1 on a workpiece W to be provided with an ordinary plane surface. The dotted lines $c_1$ and $d_1$ may represent traces of the imaginary surface through the parts of the workpiece W remaining between the grinding cracks. If it is desired to conventionalize the grinding surface thus produced on the workpiece W it must be treated upon a plane grinding wheel the grinding material of which is of finer grain than that of the preceding disc. This second disc must carry away from the workpiece W a portion the thickness of which in the normal to the grinding wheel surface is at least equal to the distance $x$ from the dotted curve to the chain-dotted curve, which distance represents the maximum difference in height between the two imaginary surfaces. It will be recognized from Figure 1 that in this manner, at the transition from one grinding wheel to the next finer grinding wheel, as much of the workpiece must always be ground away as is determined by the deepest grinding crack produced in each instance by the preceding disc. For all the other workpiece portions this involves a superfluous expenditure of work, which in the normal case is exceedingly considerable.

Figure 2:
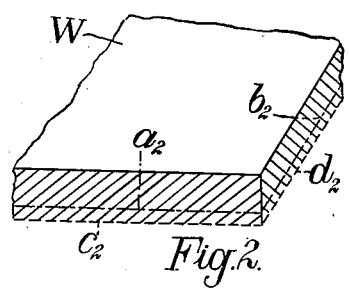
Figure 2 shows diagrammatically a section through a workpiece which has been taken from a plane grinding wheel according to the invention.

In a plane grinding wheel according to the invention the imaginary surface through all the working points or tips of the grinding material is in fact a plane. Consequently, as will be gathered from Figure 2, the traces $a_2$ and $b_2$, drawn in dot-and-dash lines, of this imaginary surface are straight. The traces $c_2$ and $d_2$, drawn in dotted lines, of the imaginary surface through the parts left standing between the grinding cracks on the workpiece W are also straight, in so far as the condition of the untreated workpiece surface, that is, the surface before the grinding wheel first used comes into operation, is disregarded. Figure 2 makes it clear that during the entire grinding operation, and particularly at every transition from one grinding wheel to the next finer grinding wheel, there is always a minimum to be removed from the workpiece W, and therefore also a minimum expenditure of work to be performed altogether, because with the grinding tool according to the invention that imaginary surface through all the grinding material tips is already identical with the surface to be produced on the workpiece.

Figure 4:
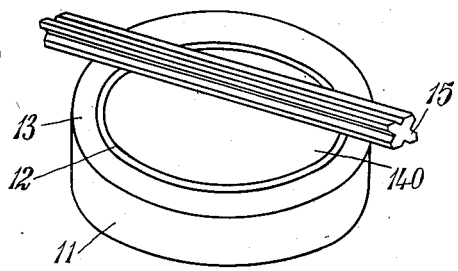
Figure 4 illustrates the treatment of the coated surface of a carrier for a grinding wheel according to Figure 3.
Figure 3:
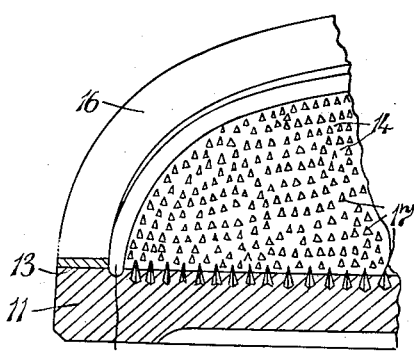
Figure 3 is a perspective view, partly in section, of a round grinding wheel according to the invention.

The carrier 11 for a round grinding disc according to the invention may have a cross-sectional form such as that shown in Figure 3, in which the armoured zone is separated by a circular groove 12 from a plane margin 13, which is exactly flush with the surface to be covered, from which, after the armouring the particles are free. In order to ensure this evenness there is removed from the correspondingly pre-worked carrier, by means of an auxiliary tool 15, which is guided over it in an uninterrupted stroke, and which, in the constructional example according to Figure 4, is cross-shaped in cross section, one shaving per stroke from the entire surface, that is, from the margin 13 and from the middle 140 to be armoured, so that the latter receives the shape and the grade of quality of the surface to be ground on the workpiece by the finished tool. The cutting edge of the auxiliary tool 15 must be exactly a generatrix of the surface to be provided on the workpiece by the finished grinding tool. If it is a question, as in the constructional example according to Figure 4, of a plane grinding disc, then the cutting edge of the auxiliary tool 14 must be exactly straight. It is also possible to true cylindrical surfaces with such an auxiliary tool, in so far as it is accurately guided in such a way that the cutting edge traverses the desired cylindrical arc perpendicularly to its extent, that is, is guided in a circle. If it is desired to produce a cylindrical surface on the carrier of a grinding tool according to the invention by means of an auxiliary tool guided in a straight line, the cutting edge thereof must extend exactly along the circular arc in question.

After this treatment of the surfaces 13 and 140 of the carrier 11 there is galvanically applied to the marginal surface 13 thereof a coating 16 (Figure 3), the thickness of which is made exactly equal to the amount by which the grains of grinding material 17 are to stand out beyond the surface 140. The quantity of grinding material intended for the surface 140 of the carrier 11 thus prepared is then applied to it with the utmost possible uniformity. To this uniformity pertains the most extensive standardisation of the size of grain of the individual parts 17 of grinding material. This can be obtained with particular advantage by sedimentation of the grinding material. Upon the marginal surfaces 13 of the carrier 11 is stood a stationary vessel which is open at the bottom but makes a fluid-tight joint with the margin 13, and which contains a liquid, for instance bromoform, water, alcohol or the like, or, in the case of very fine-grained grinding material, a gas, preferably a heavy gas, for instance krypton, which may even be subject to substantial pressure. The grinding material, already very uniformly selected in advance according to its size of grain, is placed in the liquid or gas in question and is then deposited, on sinking, in quite regular distribution, upon the surface 140 of the carrier 11. After the termination of this operation the sedimenting medium is siphoned off, and the carrier 11, coated on its surface 140 with the grains of grinding material 17, is separated from the stationary vessel, whereupon the residue of the liquid not removed by siphoning may be allowed to evaporate on the grinding coating. Finally the grains of lump material 17 deposited are pressed into the carrier 11, until their tips are exactly flush with the surface through the coating 16. This result can be obtained either by pressing the grains in by means of a ram, guided transversely to the normal through the surface 140 in a slightly yielding manner, and consequently bearing accurately upon the coating 16, the surface of this ram that faces the carrier 11 agreeing exactly with the surface through the coating 16, or else by rolling the grains in by means of a roller bearing on the coating 16, the entire generatrix of which lies perpendicularly to the axis of the roller exactly in the surface through the coating 16, so that the surface of the roller therefore has the best possible quality. The tool thus obtained according to the invention is ready for use, and exhibits, in the regularity of the covering of grinding material, small free surfaces 14 (Figure 3) between the individual grains of grinding material 17. These small free surfaces 14 will in general no longer lie exactly in the surface 140, since their margins are somewhat deformed by the pressing in of the grains of grinding material. These free surfaces 14 may be optionally made of larger dimensions in any desired pattern, so that a sort of grating-like pattern on the armoured coating of grinding material is recognizable.

Figure 5:
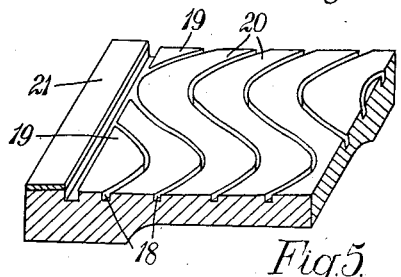
Figure 5 is a partial view of a longitudinally patterned plane grinding plate according to the invention.
Figure 6:
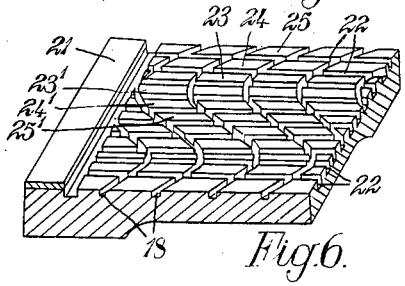
Figures 6 and 7 represent portions of grinding tools grated cross-wise according to the invention.
Figure 7:
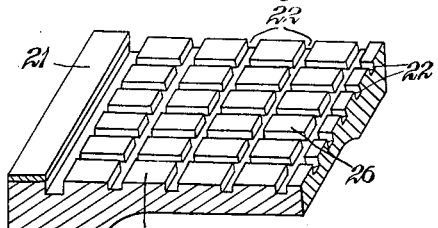

It is however also possible to form a grating-like pattern on the carrier surface 140 by applying recesses, and this must be done before the treatment with the auxiliary tool 15, which removes only one shaving at a time in a single stroke. If equidistant sinusoidal grooves 18 are applied, which admits of being accomplished without difficulty, the carrier 11 shown in Figure 5 is then obtained for a rectangular grinding disc, which may be intended for the grinding of comparatively narrow workpiece surfaces, and, apart from the marginal portions 19, presents coated zones 20 of similar form, each of which has the shape of a sinusoidal band. If equidistant rectilinear grooves 22 extending between the marginal ledges 21 are added to form a transverse grating pattern, the carrier illustrated in Figure 6 is obtained, which exhibits armoured zones 23 and 23', 24 and 24' and 25 and 25', of similar forms arranged in groups which are mirror images of one another. A uniform intersecting pattern is exhibited by the carrier according to Figure 7, in the armoured surface of which are arranged straight grooves 22 perpendicular to one another, which may for instance be milled in, pressed in, cut in or the like, so that square armoured zones 26 all alike in shape are formed. The grinding material that reaches the bottom of the grooves is rinsed out or blown out, after the aforementioned pressing or rolling, by means of a current of gas or liquid.

Figure 8:
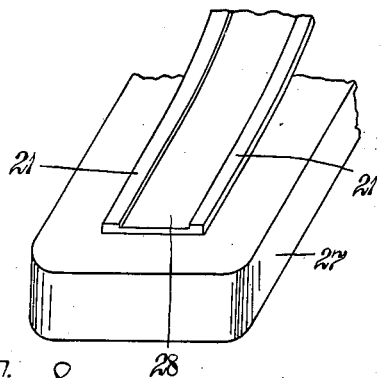
Figures 8 and 9 illustrate the manufacture of grinding foils according to the invention.

In order to manufacture a grinding foil according to the invention a foil 28 is first deposited galvanically upon a massive support 27, as indicated in Figure 8, and this foil is provided with marginal ledges 21 corresponding to the marginal ledges of the tool illustrated in Figure 5. Such a foil 28, after the finishing treatment thereof, which is effected as in the case of the grinding wheels illustrated in Figures 3 to 7, admits, as indicated in Figure 8, of being pulled off the support 27, whereupon the two marginal ledges 21 are mechanically removed.

Figure 9:
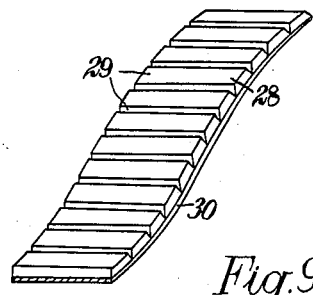

Figure 9 illustrates a tool according to the invention in which a foil 28, provided with parallel pattern grooves 29, and adhering firmly to a steel band 30 as a support, is produced galvanically. The entire foil 28 may be produced with the breadth of the steel band 30, so that from it, on both sides, strips of the breadth of the marginal ledges 21 (Figure 8) that are indispensable when pressing in the grinding material, have to be cut off, or a foil 28 broader to the extent of these marginal ledges 21 may be formed galvanically upon a support 27 (Figure 8), upon which the steel band 30 then rests, so that finally only the marginal ledges 21 of the galvanically produced foil 28 need be cut off.

A repetition of these working operations on the same piece leads to a tool according to the invention which is armed with grinding material on both sides. The two coatings may be the same or different in the size of grain of the grinding material. The steel band may also be replaced by a rigid body, of the shape for instance of an ordinary file, and file-like grinding tools according to the invention may be obtained in this way, in which case ordinary files, for instance used files, may be directly employed as centre pieces therein. One is not limited herein to plane grinding surfaces.

Figure 10:
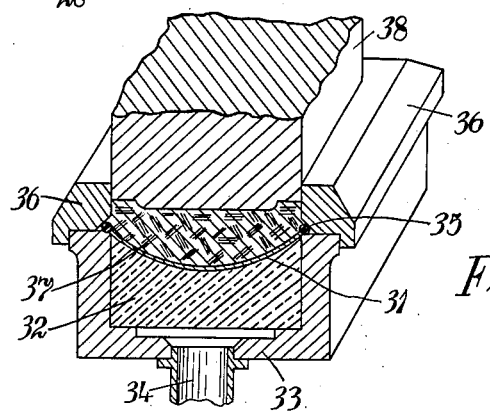
Figure 10 is a section through apparatus for manufacturing a half-round grinding tool according to the invention.

The steel band, or a bar or file, serves as a stiffening carrier for the armoured foil or foils. Now it is not necessary to make such a carrier of a high-grade and therefore expensive material, for instance of a hard metal, such as steel. It may be made of concrete, or of materials moulded under pressure, for instance artificial resins or the like. Figure 10 relates to the manufacture of a tool according to the invention with a so-called half-round grinding surface constructed upon a foil, with a stiffening foil-carrier of a material mouldable under pressure. The process of manufacture here differs from that in the case of the grinding tools according to Figures 3 to 9. In particular the foil surface to be armoured with grinding material is produced with the requisite quality in a manner different from that hitherto described.

Firstly the foil is galvanically deposited upon a support, as in the case of the grinding tool according to Figure 8. The quality of the surface of the support employed for this purpose must, however, as distinguished from that of the support 27 in Figure 8, be at least equal to the quality of the surface to be ground with the finished tool, for as contrasted with the tool according to Figure 8, the surface of the foil 31 facing the support in the case of the tool according to Figure 10 is armoured with grinding material.

The galvanically deposited foil 31, in being pulled off the support provided as described above, the surface of which, like the armoured surfaces of the tools according to Figures 3 to 9, may be treated with an auxiliary tool 15 (Figure 4), changes its shape in the main, but this does not disturb the surface constitution in sufficiently small parts. It is therefore possible to restore the foil 31, when drawn off, to the shape determined by the bearing surface of the support, or to convert it into a shape with a surface capable of being developed in a plane, and for this purpose according to the invention a clamping chuck is employed.

In Figure 10 this clamping chuck is for example a vacuum clamping chuck 32, which can be made for instance from a so-called Jena filter glass plate. The vacuum clamping chuck 32 lies securely positioned in the lower ram 33 of a press mould, from which a pipe line 34 leads away for the purpose of generating pressure differences as compared with the space outside. The foil 31, pulled off its support, is embedded upon the surface of the vacuum clamping chuck 32, which exhibits the quality of the coating surface of the grinding tool, so that this coating surface no longer needs any after treatment before the pressing of the grinding material into the foil 31 of the tool. The half-round foil 31 of the tool according to Figure 10 may be produced as a plane foil upon a support. In the case of long foils, the pulling of the foil off the support is then facilitated. In order to ensure a firm adhesion of the pressed member stiffening the foil 31 to the back surface of the foil, provision is made, in the galvanic production of the foil for this back surface to be rough.

The foil 31 embedded upon the vacuum clamping chuck 32 is subjected, after applying, it may be, a sealing means 35 to the margins, to a partial vacuum in the clamping chuck 32, and consequently the foil 31 assumes its ultimate shape. A guiding member 36 is then set upon the free margin of the lower ram 33, the mouldable material 37 is filled in, and the upper ram 38 is brought into action. In the case of artificial resin materials the hardening of the moulded block thereupon follows in the mould, and that which is taken out of the mould, with the assistance then, it may be, of a raised pressure in the clamping chuck 32, is prepared, by galvanic application of marginal ledges, as previously described, for the equipment of grinding material thereon, which is effected by means of a press plate or a roller in the manner set forth.

Figure 11:
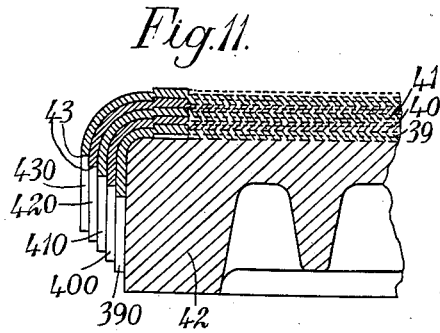
Figure 11 is a partial section along the line XI—XI in Figure 12 through a round multiple grinding disc according to the invention.
Figure 12:
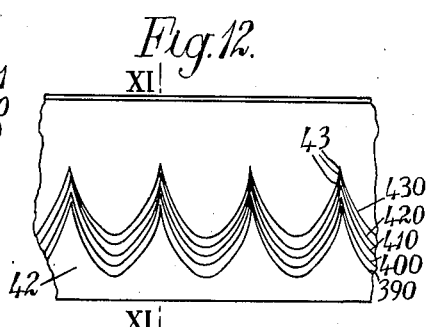
Figure 12 illustrates a detail of this multiple grinding disc.

Foils can also be galvanically applied to a finished grinding tool according to the invention, and this renders possible the manufacture of a tool with a plurality of grinding surfaces. This enables interrupted foils 39, 40, 41 ... with marginal flaps 390, 400, 410 ... lying one above another like steps as holding means to be produced, as shown in Figures 11 and 12. For this purpose the margin of the particular support is clasped, that is, at the beginning the margin of the carrier 42, and afterwards it and the margin of the foils already placed upon it, are clasped with a corresponding and preferably resilient body of insulating material, for instance with a toothed india rubber ring, which is slid a very little higher with the production of each fresh foil. The foils admit of being particularly conveniently pulled off individually one after the other if according to Figure 12 the joints 43 between adjacent marginal flaps of each individual foil are made sharp-edged, for then the foil tears here when drawn off.

In the case of the grinding tool according to Figure 11 the carrier 42 is a casting with reinforcing ribs 44. For smaller grinding tools according to the invention, plates and discs of metal are sufficient, the back of which is provided with a so-called relief pressing.

What I claim is:

1. A grinding tool, consisting of a metallic carrier, formed with recesses defining a plurality of supports, and grinding material in the form of grains secured directly to each support, the tips of all the grains of grinding material standing out freely above the surface of each support, and being located in an imaginary surface which is equidistant from the carrier surface and is complementary with the surface to be ground by the tool.

2. A grinding tool consisting of a rigid carrier and grinding material in the form of grains secured directly to the carrier, a set of pliable metallic foils secured on the carrier in superimposed relation to each other so as to be individually withdrawable therefrom in succession, grinding material in the form of grains secured directly to the individual foils, the tips of all the grains of grinding material standing out freely above the surface of the carrier and the foils respectively and being located in an imaginary surface which is equidistant from the respective surfaces of the carrier and foils and is complementary with the surface to be ground by the tool.

3. A method of manufacturing a grinding tool, consisting in forming a surface on a metallic carrier, finishing the surface thus formed by passing an auxiliary tool over the entire surface in an uninterrupted stroke and thereby removing a single shaving, applying granular grinding material uniformly to the surface thus formed on the carrier, and pressing the said granular grinding material into the carrier to a predetermined extent by means of a body of unchangeable form, which consists of a material harder than the prepared surface of the carrier.

4. A method of manufacturing a grinding tool, consisting in forming a surface on a metallic carrier, galvanically depositing upon a marginal zone of the carrier surface a coating the thickness of which is equal to the amount by which the grinding material is to project from the prepared carrier surface, applying granular grinding material uniformly to the prepared carrier surface except upon the maginal zone thus coated, and pressing the said granular grinding material into the carrier to a predetermined extent by means of a body of unchangeable form guided by the coating deposited on the marginal zone, which consists of a material harder than the prepared surface of the carrier.

5. A method of manufacturing a grinding tool, consisting in forming a surface on a metallic carrier, applying granular grinding material uniformly to the surface thus formed on the carrier, pressing the said granular grinding material into the carrier to a predetermined extent by means of a body of unchangeable form, which consists of a material harder than the prepared surface of the carrier, galvanically depositing a metallic foil forming a second carrier upon the surface of the grinding tool thus made, finishing the surface formed by passing an auxiliary tool over the entire surface in an uninterrupted stroke and thereby removing a single shaving, equipping this second carrier surface with granular grinding material and pressing in this material as before, repeating the formation and finishing of carrier foils thereon and the provision and pressing of granular grinding material, and providing the successive carrier foils with individually accessible gripping points to enable them to be successively pulled off.

6. A grinding tool consisting of a rigid carrier, and grinding material in the form of grains secured directly to the carrier, a set of pliable metallic foils secured on the carrier in superimposed relation to each other, so as to be individually withdrawable therefrom in succession, a tongue formed on the marginal portion of each foil, the tongues in each foil being of equal length and superimposed stepwise, grinding material in the form of grains secured directly to the individual foils, the tips of all the grains of grinding material standing out freely above the carrier and the foils, respectively, and being located in an imaginary surface which is equidistant from the respective surface of the carrier and foils, and is complementary with the surface to be ground by the tool.

7. A grinding tool consisting of a rigid carrier, and grinding material in the form of grains secured directly to the carrier, a set of pliable metallic foils secured on the carrier in superimposed relation to each other, so as to be individually withdrawable therefrom in succession, a tongue formed on the marginal portion of each foil, the tongues in each foil being of equal length and superimposed stepwise, and connected to the bodies of the respective foils by sharp edges, grinding material in the form of grains secured directly to the individual foils, the tips of all the grains of grinding material standing out freely above the carrier and the foils, respectively, and being located in an imaginary surface which is equidistant from the respective surfaces of the carrier and foils, and is complementary with the surface to be ground by the tool.

HERMANN SCHNEIDER.